United States Patent
Wenzel et al.

(10) Patent No.: US 7,391,752 B1
(45) Date of Patent: Jun. 24, 2008

(54) METHOD FOR GENERATION OF UNIQUE MOBILE STATION IDS IN A 1×EVDO NETWORK

(75) Inventors: Peter Wenzel, Plano, TX (US); Jerry Mizell, Plano, TX (US)

(73) Assignee: Nortel Networks Limited, St. Laurent, Quebec (CA)

(*) Notice: Subject to any disclaimer, the term of this patent is extended or adjusted under 35 U.S.C. 154(b) by 939 days.

(21) Appl. No.: 10/277,781

(22) Filed: Oct. 22, 2002

(51) Int. Cl.
*H04L 12/66* (2006.01)
*H04Q 7/20* (2006.01)
*H04Q 7/00* (2006.01)

(52) U.S. Cl. .................. 370/331; 370/352; 370/401; 455/436; 455/456.1

(58) Field of Classification Search .......... 370/335, 370/329, 331, 342, 352, 320, 338; 455/435.1, 455/414.4, 411, 436, 439, 450, 456.2
See application file for complete search history.

(56) References Cited

U.S. PATENT DOCUMENTS

| | | | |
|---|---|---|---|
| 6,556,840 B2 * | 4/2003 | Zicker et al. ............... | 455/551 |
| 6,819,918 B2 * | 11/2004 | Chin et al. .................. | 455/411 |
| 6,876,640 B1 * | 4/2005 | Bertrand et al. ............ | 370/331 |
| 7,076,240 B2 * | 7/2006 | Holmes ....................... | 455/411 |
| 7,127,249 B2 * | 10/2006 | Miernik .................... | 455/435.1 |
| 2002/0193110 A1 * | 12/2002 | Julka et al. ................. | 455/432 |

* cited by examiner

*Primary Examiner*—Hanh Nguyen
(74) *Attorney, Agent, or Firm*—Garlick Harrison & Markison; James A. Harrison; Kevin L. Smith

(57) ABSTRACT

A method and apparatus are presented for generating unique MSIDs for access terminals (AT) that do not present an MSID to the access network controller (ANC). The electronic serial number (ESN) of the AT is first converted to an ASCII character string representing the unsigned decimal equivalent of the 32 bit ESN. The ASCII string is padded with leading "0" (zeros), if necessary, to create a 10 character string. The ANC generates a 5 character string unique to all 1×EVDO networks then concatenates the two strings to create a unique 15 character string. The created 15 character string is then presented to the PDSN to establish a network session.

16 Claims, 7 Drawing Sheets

Communication network

Method for maintaining an 1xEVDO session

Signal sequence diagram

Network session method

Unique number generation

ANC block diagram

Voice and data network

METHOD FOR GENERATION OF UNIQUE MOBILE STATION IDS IN A 1×EVDO NETWORK

BACKGROUND

1. Field of the Invention

The present invention relates to mobile communication devices and, more particularly, the present invention relates to mobile terminals capable of communicating in a data-only mode with a data network, as well as mobile terminals capable of communicating in voice and data modes.

2. Related Art

Wireless communication service providers, as well as Internet service providers, face some difficult challenges as the various networks are increasingly modified to work together to provide seamless end-to-end call connectivity across the various platforms. Ever-increasing residential dial-up subscribers demand available modem (or ISDN) ports, or threaten to take their business elsewhere. To meet this demand, Internet service providers are deploying a large number of complex, port-dense network access servers (NAS) to handle thousands of individual dial-up connections. As such, small and large, as well as private and public, wireless data networks are being created to seamlessly interact with large wire line networks to enable users to establish point-to-point connections independent of terminal type and location. Traditionally, however, voice networks have paved the way for the creation of data networks as users loaded the voice networks trying to transmit data, including streaming data (video and voice). Initially, traditional Public Switched Telephone Networks (PSTNs) were used for data transmissions but have been largely supplanted by data packet networks, including various versions of the "Internet".

The wireless domain has had a parallel history. Initial voice networks, including AMPS, Time Division Multiple Access (TDMA) including North American TDMA and Global System for Mobile Communications (GSM), were used to conduct data in a limited capacity. These networks are being replaced, however, by newer wireless data-only networks, as well as data and voice networks.

The structure and operation of wireless communication systems are generally known. Examples of such wireless communication systems include cellular systems and wireless local area networks, among others. Equipment that is deployed in these communication systems is typically built to support standardized operations, i.e., operating standards. These operating standards prescribe particular carrier frequencies, modulation types, baud rates, physical layer frame structures, MAC layer operations, link layer operations, etc. By complying with these operating standards, equipment interoperability is achieved.

In a cellular system, a regulatory body typically licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscriber units within the service area. Typically, these channels are equally spaced across the licensed spectrum. The separation between adjacent carriers is defined by the operating standards and is selected to maximize the capacity supported within the licensed spectrum without excessive interference. In most cases, severe limitations are placed upon the amount of co-channel and adjacent channel interference that may be caused by transmissions on a particular channel.

In cellular systems, a plurality of base stations is distributed across the service area. Each base station services wireless communications within a respective cell. Each cell may be further subdivided into a plurality of sectors. In many cellular systems, e.g., GSM cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most, if not all, cellular systems, carrier frequencies are reused so that interference between base stations using the same carrier frequencies is minimized and system capacity is increased. Typically, base stations using the same carrier frequencies are geographically separated so that minimal interference results.

Traditional wireless mobile networks include Mobile Station Controllers (MSCs), Base Station Controllers (BSCs) and Base Transceiver Station (BTS) systems that jointly operate to communicate with mobile stations over a wireless communication link. Examples of common networks include the GSM networks, North American TDMA networks and Code Division Multiple Access (CDMA) networks. Extensive infrastructures (e.g., ANSI-41 or MAP-based networks) exist in the cellular wireless networks for tracking mobility, distributing subscriber profiles, and authenticating physical devices.

To establish a wireless communication link in traditional wireless voice networks, an MSC communicates with a BSC to prompt the BTS (collectively "Base Station" or "BS") to generate paging signals to a specified mobile station within a defined service area typically known as a cell or sector (a cell portion). The mobile station, upon receiving the page request, responds to indicate that it is present and available to accept an incoming call. Thereafter, the BS, upon receiving a page response from the mobile station, communicates with the MSC to advise it of the same. The call is then routed through the BS to the mobile station as the call setup is completed and the communication link is created. Alternatively, to establish a call, a mobile station generates call setup signals that are processed by various network elements in a synchronized manner to authenticate the user as a part of placing the call. The authentication process includes, for example, communicating with a Home Location Register (HLR) to obtain user and terminal profile information.

The next generation of cellular networks presently being developed are being modified from traditional systems to create the ability for mobile stations to receive and transmit data in a manner that provides greatly increased throughput rates. For example, many new mobile stations, often referred to as mobile terminals (MT) or access terminals (AT), are being developed to enable a user to surf the web or send and receive e-mail messages through the wireless mobile terminal, as well as to be able to receive continuous bit rate data, including so called "streaming data". Accordingly, different systems and networks are being developed to expand such capabilities and to improve their operational characteristics.

One example of a system that is presently being deployed with voice and data capabilities is the CDMA2000 network. The CDMA2000 network, however, is developed from the IS-95 networks that were optimized for voice transmissions and therefore is not optimized for transmitting data even though its data transport capability is significantly improved from prior art networks and systems. More formally, the 1xRTT standard defines CDMA operation for data transmissions.

One data-only network that is being developed is defined by the 1xEVDO standard. The 1xEVDO standard defines a time burst system utilizing a 1.25 MHz carrier that is set at a carrier frequency that is adjacent to the frequencies used by the voice networks. In one particular network, a 1.67 millisecond (mS) burst is used for the forward link in a 1xEVDO network. Typical 1xEVDO networks include a Packet Data Serving Node (PDSN) for performing routing and switching for a data packet or data packet stream, an Access Network Controller (ANC) that establishes and manages the wireless communication link with the mobile terminal, and a Packet Control Function (PCF) that is largely an interface device for converting signals between the packet domain and a wireless network that will be used for the communication link.

The 1xEVDO network is optimized for forward link data applications. The next generation of 1xRTT networks that are being deployed can communicate with voice and data networks but do not process data as efficiently as the networks formed according to the 1xEVDO standard. Newer networks are also being designed and have evolved from the 1xEVDO standard, including 1xEVDV, which is for transmitting data as well as voice.

The 1xEVDO networks that have been previously described are not formed, however, to interact seamlessly between the voice and data networks. For example, the 1xEVDO networks do not have or fully utilize Signaling System Number 7 (SS7) type network components to assist with call setup, user and mobile station authentication, call routing, and feature delivery. The 1xEVDO networks are formed to carry data only and do not include the full functionality and capabilities of wireless voice networks. The infrastructure of the 1xEVDO network is different and simpler than SS7-based voice networks (wire line or wireless).

1xEVDO does not provide all hand-off capabilities and functionality of typical voice network. Accordingly, present mobile terminals only provide some of these traditional voice network features and, in some cases, only in a rudimentary way. For example, the designs in the 1xEVDO standard only provide for user authentication, not terminal authentication. Because traditional SS7-type network components are not fully available in 1xEVDO networks, compatibility and control problems are readily noticeable.

One problem that has been identified in 1xEVDO networks is that while the PDSN requires the presence of a unique MSID for mobility, access terminals that connect to data only networks do not have phone numbers and therefore do not have an assigned and unique MSID. Traditional mobile stations have MSIDs based on the mobile station phone number and therefore are guaranteed to be unique. Many 1xEVDO networks, however, do not have the ability to generate a unique MSID. Thus it is likely that one MSID may be assigned to multiple access terminals to create a collision. What is need, therefore, is a method of generating unique MSIDs (for access terminals that do not present an MSID to the ANC) that is guaranteed not to conflict with MSIDs across other networks.

SUMMARY OF THE INVENTION

A method and apparatus are provided for generating unique MSIDs for access terminals (AT) that do not present an MSID to the access network controller (ANC). More specifically, an ANC and/or a packet control function (PCF) included an ability to determine that a unique MSID needs to be generated and logic to generate the unique MSID. Every electronic serial number (ESN) is unique. Because an MSID based solely on an ESN could conflict with an MSID created for another access terminal for a 1xRTT network served by the same PDSN, the present invention contemplates appending a unique five digit ID that reflects or corresponds to 1xEVDO networks. More specifically, the ESN of the AT is first converted to an ASCII character string representing the unsigned decimal equivalent of the 32-bit ESN. The ASCII string is padded with leading "0" (zeros), if necessary, to create a 10 character string. The ANC generates a 5 character string unique to all 1xEVDO networks then concatenates the two strings to create a unique 15 character string. The created 15 character string is then presented to the PDSN to establish a network session. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
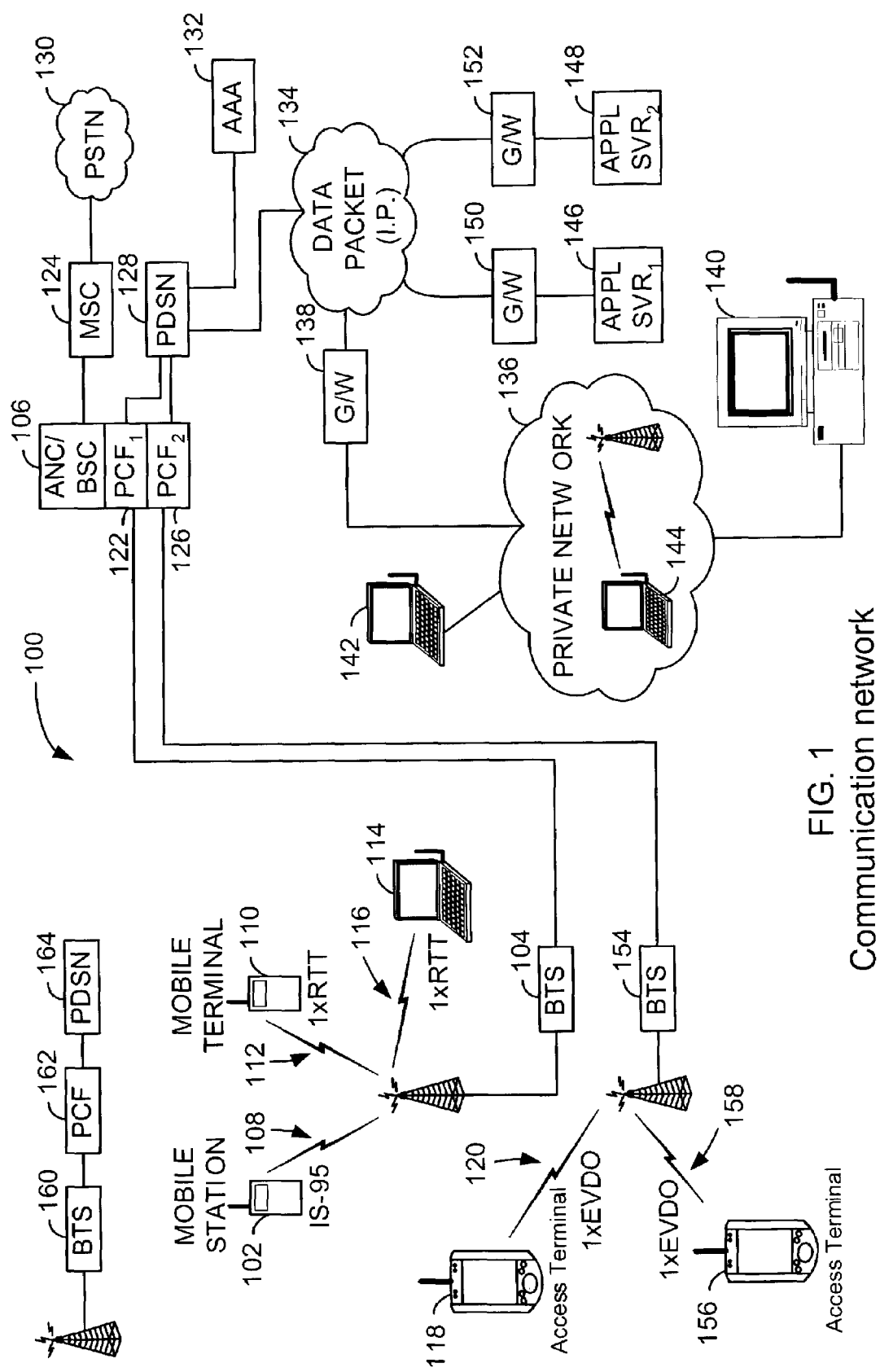
FIG. 1 is a functional block diagram of a communication network formed according to one embodiment of the present invention.

FIG. 1 is a functional block diagram of a communication network formed according to one embodiment of the present invention. As may be seen, a communication network 100 includes many networks that are coupled to operatively communicate with each other to enable a user in one type of network to communicate with a user in a different type of network. For example, the communication network 100 creates an ability for a wire line user terminal coupled to a private network to communicate with a mobile terminal through a wireless communication link. Such transparent operation with respect to the user is improving access to information and the ability for individuals to communicate to a level that is unprecedented. As discussed before, existing wireless networks have, heretofore, been adapted primarily for carrying voice calls. Accordingly, when used in conjunction with a computer terminal, the wireless voice networks were able to transmit or receive data at rates that today are viewed as unacceptably slow although they were appreciated at the outset.

Along these lines, a mobile station 102 is located within a geographic area served by a Base Transceiver Station (BTS) 104 that is coupled to a Base Station Controller (BSC) 106. More specifically, mobile station 102 communicates with BTS 104 by way of an IS-95 CDMA wireless communication network link shown generally at 108. Similarly, a mobile terminal 110 that is capable of supporting both voice and data calls communicates with BTS 104 over a wireless communication link shown generally at 112 and establishes either voice calls or data calls under the CDMA2000 1xRTT protocols. In the example herein, mobile terminal 110 is engaged in a voice call, as defined by a service option generated by a mobile terminal during call setup, and thus wireless communication link 112 is transmitting merely voice signals and associated control signaling.

Similarly, a mobile terminal 114 is engaged in a data call (data session) according to 1xRTT protocols over a wireless communication link shown generally at 116. Finally, an access terminal 118 is engaged in a data session over a wireless communication link, shown generally at 120, according to 1xEVDO protocols in a so called "simple-IP" or "mobile-IP" network, as those terms are understood by one of average skill in the art. In general, simple-IP and mobile-IP networks do not include control-signaling protocols that are as extensive as some existing systems. In particular, simple-IP and mobile-IP networks do not include a "heartbeat" mechanism used to determine that a wireless terminal is present and operational.

The 1xEVDO network of the described embodiment is a high data rate, high performance and cost effective wireless data packet solution that offers high capacity and is optimized for packet data services. It provides a peak data rate, under current technology, of 2.4 Mbps within one CDMA carrier operating at a bandwidth of 1.2 MHz and supports Internet protocols and further facilitate an "always on" connection so that users are able to rapidly send and receive wireless data. Along these lines, the 1xEVDO network is formed to support connectionless communication links in contrast to traditional connection-oriented networks, such as the PSTN, and transmits Protocol Data Units (PDUs) which comprise data packets layered in a protocol such as an IP protocol. In general, the 1xEVDO transmits the PDUs in a bursty fashion notwithstanding its underlying CDMA technology. For hybrid mobile terminals capable of supporting both voice and data calls, the 1xEVDO transmits the PDUs for the data on separate 1.25 MHz channels with respect to voice thereby achieving higher system capacity.

1 xEVDO network topology is a little different from traditional wireless networks, including 1xRTT data networks. More specifically, while wireless voice networks and 1xRTT data networks all include the use of a BSC and MSC for call control and call routing, a 1xEVDO system merely communicates through the radio with ANC that in turn communicates with a packet data serving node which in turn is coupled to a data packet network such as the Internet.

Continuing to examine FIG. 1, BTS 104 is coupled to communicate with ANC/BSC 106. As is understood by one of average skill in the art, Access Network Controllers (ANCs) and Base Station Controllers (BSCs) have similar functionality. Moreover, Packet Control Function Cards can be installed either within a BSC or within an ANC according to whether the PCF is to communicate with a 1xRTT device or a 1xEVDO device, respectively. Additionally, in one embodiment of the invention, one ANC/BSC is formed with 1xRTT and 1xEVDO equipment therewithin to be multi-network capable. Thus, the embodiment of FIG. 1 contemplates such a configuration although it is to be understood that the BSC and ANC elements may readily be separated or formed as stand alone units, but are show herein as are systems for illustration.

Within ANC/BSC 106, according to one embodiment of the present invention, a plurality of different wireless network cards are included to facilitate communications with mobile stations and mobile terminals of differing protocols and types. For example, in the described embodiment, ANC/BSC 106 includes circuitry to communicate with mobile station 102 over IS-95 CDMA wireless communication network link as shown generally at 108. ANC/BSC 106 further includes a Packet Control Function (PCF) card 122 for communicating with mobile terminals 110 and 114 utilizing 1xRTT protocols in one described embodiment of the invention. As may be seen, PCF 122, which is for communicating with 1xRTT protocol devices, is coupled to an MSC 124. A PCF 126, however, is for communicating with 1xEVDO devices and thus it is coupled directly to a Packet Data Serving Node (PDSN) 128. Thus, access terminal 118 that communicates over wireless communication link 120 according to 1xEVDO communication protocols, communicates with BTS 154 and with PCF 126 formed within ANC/BSC 106 according to one embodiment of the present invention. It is understood, of course, that PCF 126 may readily be formed as a distinct device rather than within a rack of ANC/BSC 106. Moreover, PCF 126 may communicate with access terminal 118 through distinct radio equipment and, thus, through a BTS other than BTS 154 as shown herein.

MSC 124 further is coupled to a PSTN 130. Accordingly, calls routed through MSC 124 are directed either to other MSCs (not shown herein) or to external networks by way of PSTN 130. The reference to PSTN herein includes SS7 and other similar "intelligent networks". Thus, a gateway device (not shown herein) coupled to PSTN 130, may be used to access a data packet network, such as the Internet, for any data calls transmitted according to 1xRTT protocols. 1xEVDO calls, which are processed by PCF 126, however, are forwarded through PDSN 128, which, upon authentication by an Authentication, Authorization and Accounting (AAA) server 132, is connected to a data packet network, such as a data packet network 134, which, in this example, comprises the Internet. As may further be seen, data packet network 134 is coupled to a private network 136 by way of a gateway device 138. Private network 136 further is coupled through traditional wire line networks to a user terminal 140 and 142.

Data packet network 134 further is coupled to a plurality of application servers, such as application servers 146 and 148 by way of gateway devices 150 and 152, respectively. Continuing to refer to FIG. 1, ANC/BSC 106 further is coupled to a BTS 154, which is in communication with an access terminal 156 by way of a 1xEVDO communication link 158. As may be seen, access terminal 156 is served by PCF 126, as is access terminal 118. Additionally, however, a BTS 160 is coupled to a PCF 162 that, in turn, is coupled to communicate with a PDSN 164.

Any one of the 1xEVDO access terminals 156 or 118 may also communicate through PCF 162 and PDSN 164 whenever they travel through a geographic region that is served by BTS 160. In the described embodiment, PCF 162 is formed in a distinct device and is not formed as a card within a BSC as was the case with PCF 122 and PCF 126. As will be described in greater detail below, the present invention deals in part with the situation in which a data packet session has been established between an access terminal and a PCF, thereafter, the access terminal transitions to a service area covered by a different PCF. Accordingly, if, for example, access terminal 156 transition to a new service area, for example, access terminal 156 transitions from a service area that is served by PCF 126 to a service area that is served by PCF 122, PCF 122 could generate a MSID that conflicts with a mobile terminal serviced by PCF 122, mobile terminal 110 for example.

Proposed standards support a mechanism on an optional A12 interface to allow the Access Network-Authentication Authorization Accounting (AN-AAA) interface to coordinate the distribution on of unique MSIDs to 1xEVDO networks. When the A12 interface is not present, the ANC is responsible for generation of MSIDs. The ANC uses an internal mechanism to map the ESN (guaranteed to be unique) to an MSID that is unique to the 1xEVDO network but may not be unique across all networks connected to the PDSN. If the MSID generated by the ANC is the same as a mobile station connected to the PDSN through another network, such as a 1 xRTT network, then the PDSN will drop the mobile station under the assumption that a handoff is required. This situation, though statistically unlikely, will cause a denial of service to the mobile station.

Figure 2:
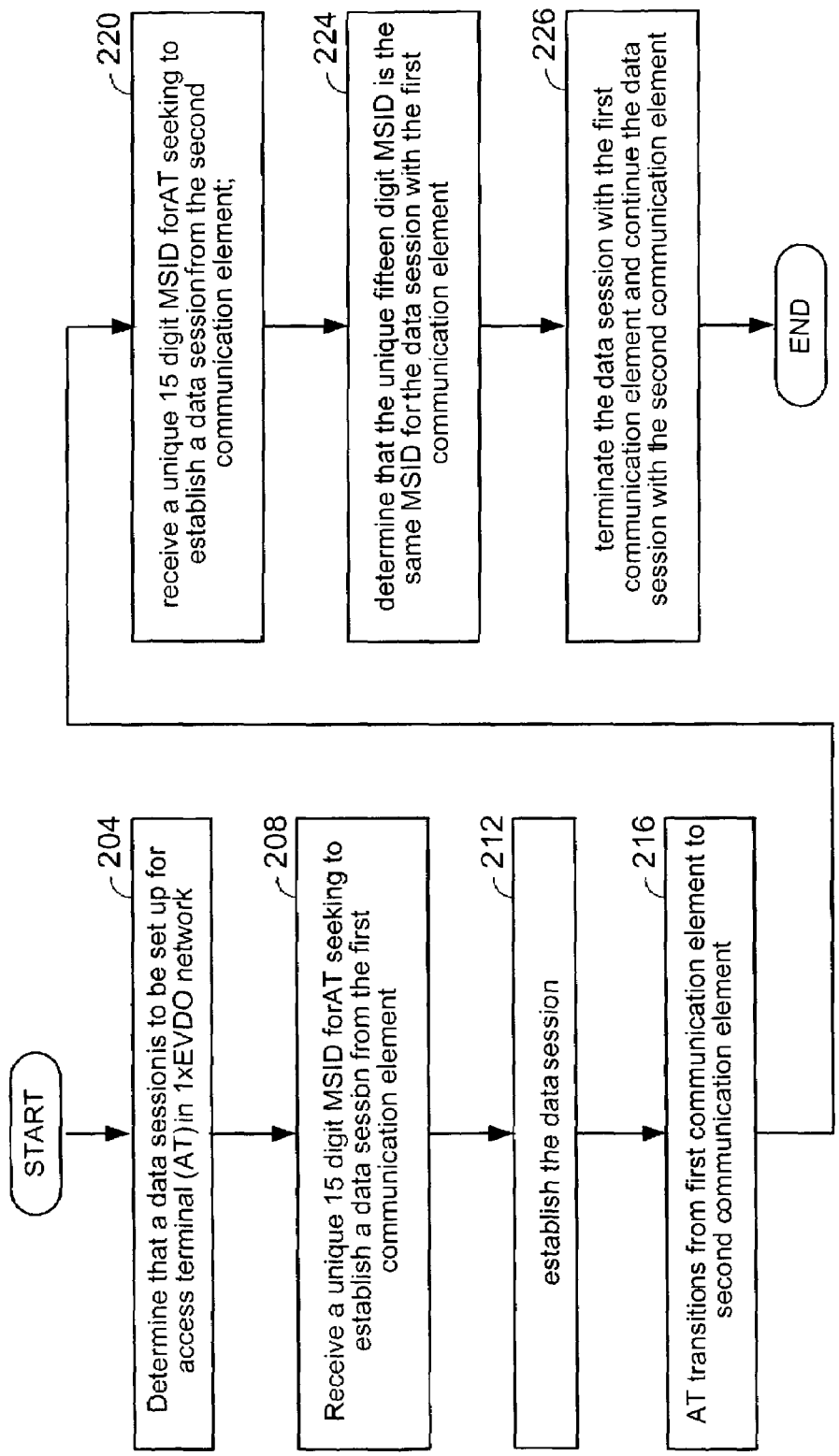
FIG. 2 is a flow chart illustrating a method for maintaining 1xEVDO session according to one embodiment of the present invention.

FIG. 2 is a flow chart illustrating a method in a packet data serving node (PDSN) for maintaining 1xEVDO session according to one embodiment of the present invention. The PDSN determines that an access terminal (AT) requires a data session in a 1xEVDO network (step 204). The PDSN receives a unique 15 digit MSID from a first communication element (e.g., an access network controller (ANC)) for the AT seeking to establish the session (step 208). Typically such a request is made of an A-11 interface as defined by current 1xEVDO standards. After receiving and replying to an A-11 registration request, an A-10 connection (data session) is created between the PDSN and PCF thereby establishing the data session (step 212). As the AT moves from a geographic area served a first communication element (a first ANC) to a geographic area served by a second communication element (a second ANC) (step 216), the AT will cross a threshold wherein the pilot signal strength from the second communication element will be greater than that being received the first communication element. The PDSN subsequently receives a unique 15 digit MSID for the AT attempting (from the perspective of the PDSN) to establish a data session (step 220). The PDSN, however, determines the received MSID is the same as the MSID received from the first communication element (step 224). The PDSN terminates the data session established with the first communication element and resumes the data session with the second communication element (step 226).

Figure 3:
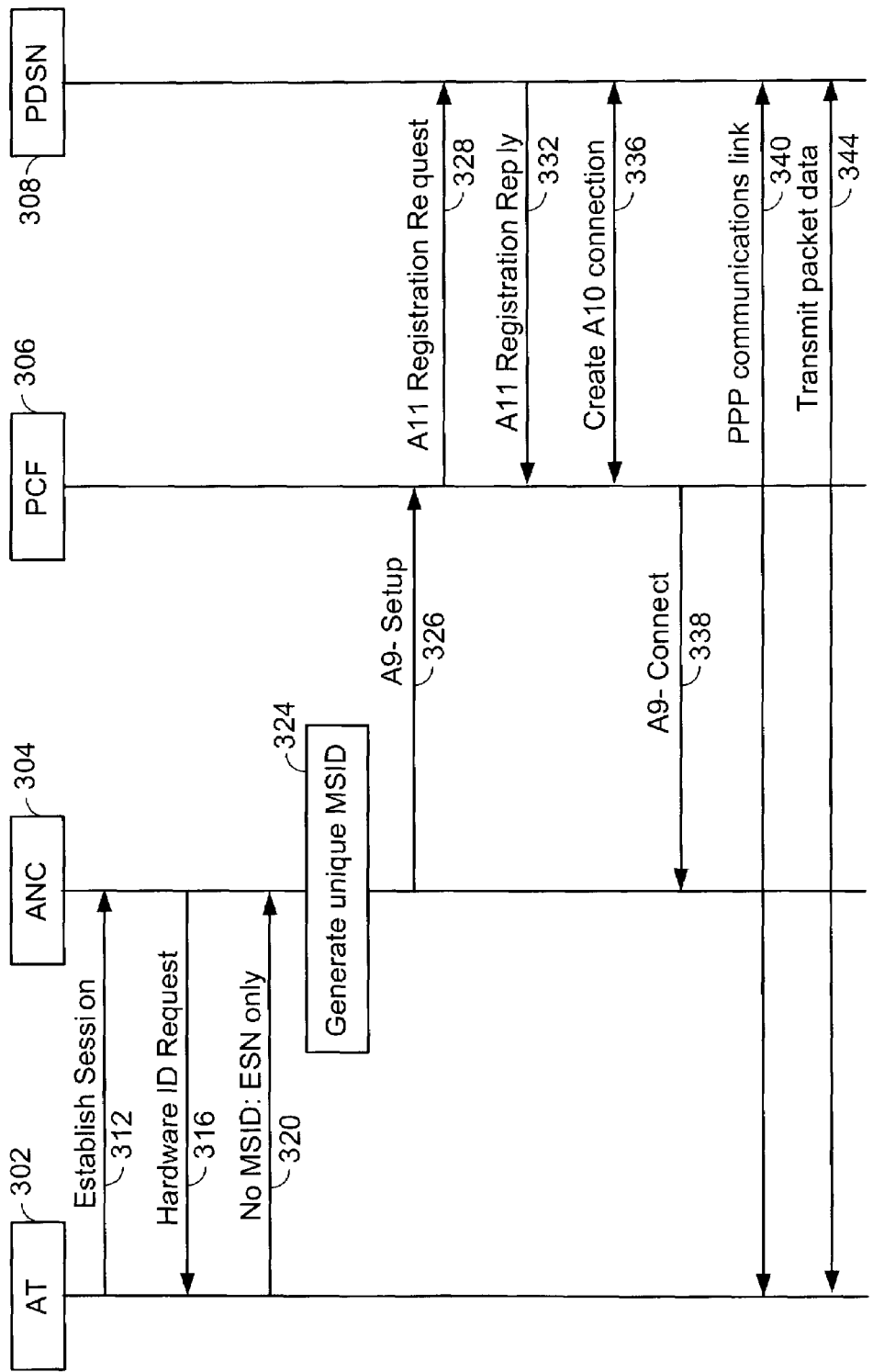
FIG. 3 is a signal sequence diagram that illustrates an embodiment of the present invention.

FIG. 3 is a signal sequence diagram that illustrates an embodiment of the present invention. As may be seen, an access terminal (AT) 302 is coupled to communicate with an access network controller (ANC) 304, a packet control function (PCF) 306, and packet data serving node (PDSN) 308 in a 1xEVDO network. Initially, the AT initiates a communication link with ANC 304 by way of signal 312. Signal 312 is transmitted from AT 302 by way of an access network transceiver (not shown) to ANC 304. ANC 304 initiates a process to determine an MSID for access terminal 302 by generating a Hardware ID Request 316. AT 302 responds with an electronic serial number (ESN) (step 320). Unlike mobile stations, access terminals do not have telephone numbers that readily are transferred into MSIDs. ANC 304 therefore generates a unique MSID based on the received ESN and a five-character identifier that is unique to all 1xEVDO networks as described herein (step 324). ANC 304 generates a setup signal over an A-9 interface (step 326). PCF 306 responds with a registration request to PDSN 308 in a registration request signal 328 over an A-11 interface. After receiving a registration reply signal 332, an A-10 connection (step 336) is created. PCF 306 then sends a connect signal to ANC 304 over A-9 interface, as shown by signal 338. As is understood by one of average skill in the art, A-9, A-10 and A-11 refer to defined interfaces between an ANC, a PCF and a PDSN. Once the session setup signals have been received, PDSN 308 and AT 302 establish a point-to-point protocol communication link (step 340). After the creation of the point-to-point protocol communication link, access terminal 302 maintains an always on data session to transmit packet data (step 344). Thereafter, if access terminal 302 should transition to a new geographical area and a new 1xEVDO network, a new ANC will generate a MSID identical to that generated by ANC 304 because the MSID is based on a common 1xEDVO interface and a unique ESN for the AT. PDSN 308 will initiate a hard hand off by first dropping the previous connection then continuing the session with the new PCF/ANC whenever it receives a connection request for an AT having an MSID that corresponds to an active data session.

Figure 4:
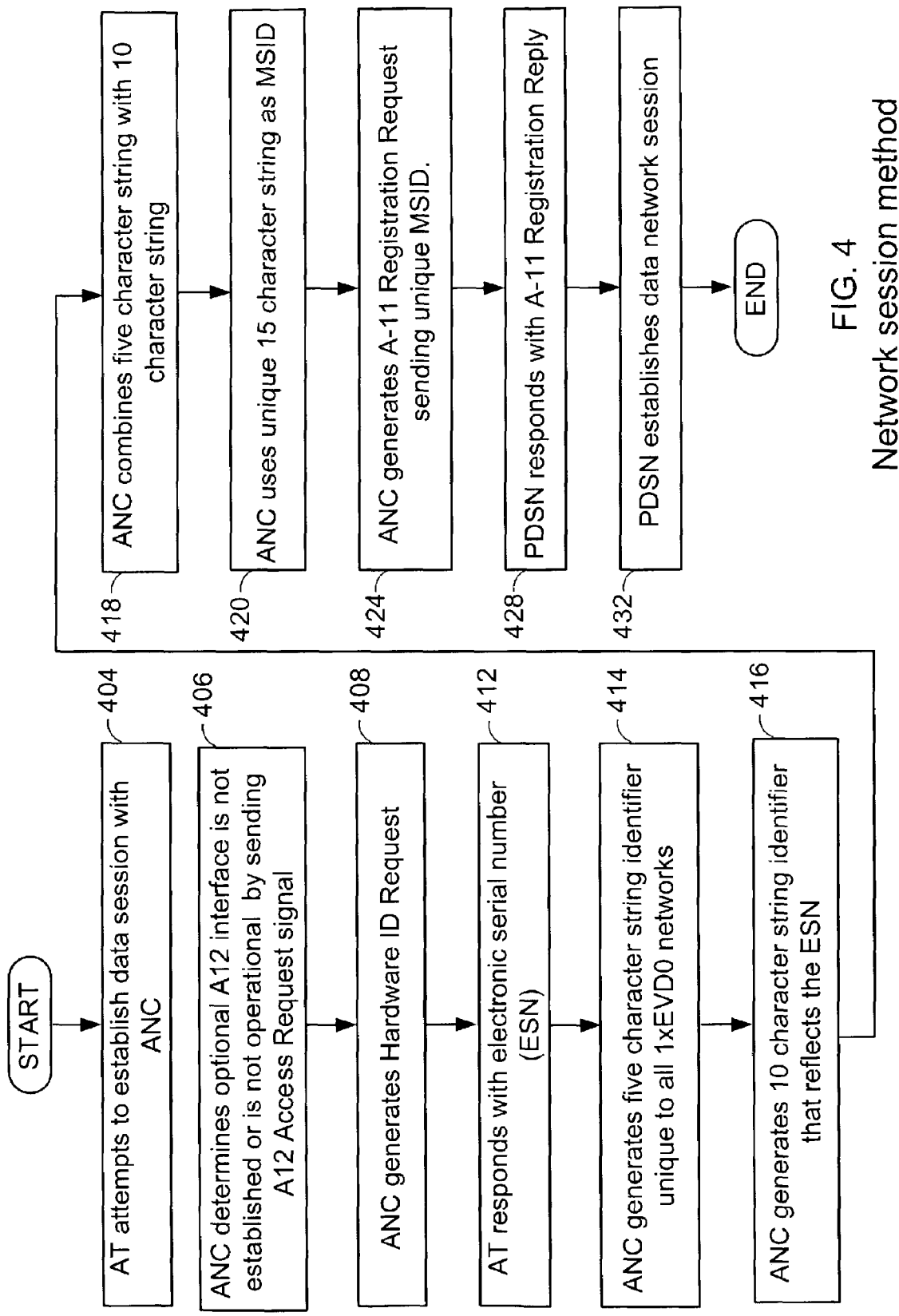
FIG. 4 is a flowchart that illustrates one method of the present invention performed by an access network controller (ANC)

FIG. 4 is a flowchart that illustrates one method of the present invention performed by an access network controller (ANC). Initially, ANC receives communication signals indicating that an access terminal (AT) seeks to establish a data session with the ANC (step 404). The ANC determines the optional A12 interface is not established or not operational by sending an A12 access request signal (step 406). In one embodiment, this step is performed only once in a given period and the result is stored. Alternatively, this determination is made every time a session is established. The AT does not have a phone number and therefore no MSID. Accordingly, the ANC must generate a unique MSID from the AT electronic serial number (ESN). Thus, the ANC generates a hardware ID request (step 408), to which the AT responds with an ESN (step 412). Using the received ESN, the ANC generates a 15-character string MSID including a five digit number unique to all 1xEVDO networks. The ANC generates a five-character string unique to all 1xEVDO networks (step 414) and also generates a 10 character string identifier that reflects the ESN (step 416). The ANC combines the five-character string with the 10 character string (step 418) to create a 15 character string that it uses as the MSID (step 420). The ANC sends the created MSID within an A-11 interface registration request to the PDSN (step 424). The PDSN responds with A-11 registration reply (step 428) and thereafter establishes a data network session (step 432).

Figure 5:
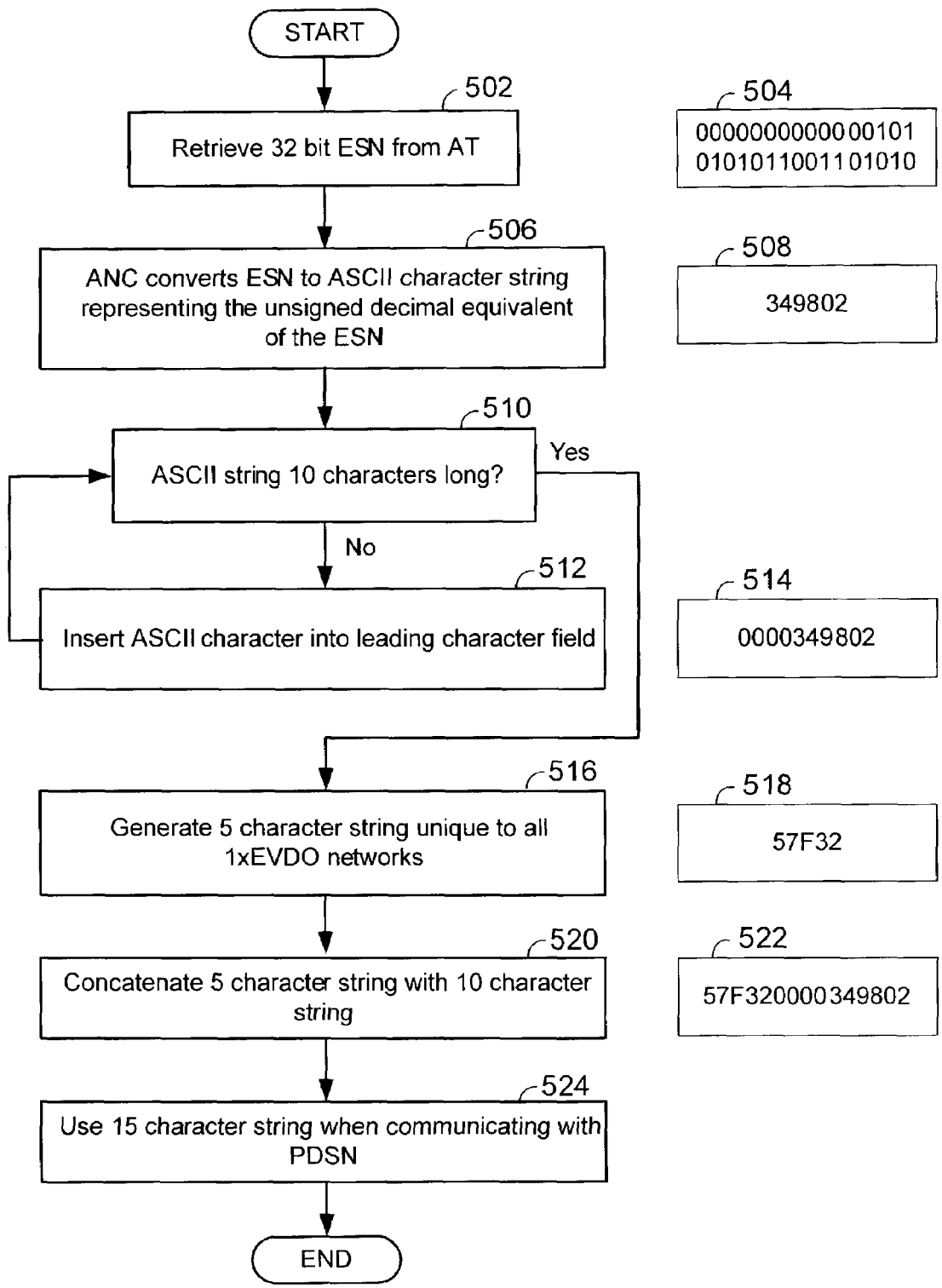
FIG. 5 is a flowchart that illustrates the generating a unique 15 character MSID from an electronic serial number (ESN), according to one embodiment of the present invention.

FIG. 5 is a flowchart that illustrates the generation of a unique 15 character MSID from an electronic serial number (ESN), according to one embodiment of the present invention. In the described embodiments, the 15 digit MSID is generated by an access network controller (ANC). In an alternate embodiment of the invention, the 15 digit MSID is generated by a packet control function (PCF) card or device. After generating a hardware ID request (not shown), the access terminal (AT) sends a 32-bit ESN to the ANC (step 502). Block 504 is an example of a 32-bit number representing a hypothetical 32 bit ESN. The ANC converts the ESN into ASCII character string representing the unsigned decimal equivalent of the ESN (step 506). The number shown in block 508 represents an example of a decimal equivalent of the number in block 504. The ANC determines if the character string is ten digits long (step 510), and if not, then fills the string with a dedicated character (zero in this example) until the string is 10 characters long (step 512). Block 514 illustrates that four zeros were prepended (appended in front of) to the decimal equivalent in block 508. The remaining 5 characters of the 15-character MSID are generated by the ANC (step 516). The algorithm assures that the 5-character string is unique and repeatable by every 1xEVDO access network controller. Block 518 is a hypothetical example of a five-character string. The 15-character string representing the MSID is created by concatenating the five-character string with the 10 character string representing the ESN (step 520). Example block 522 illustrates the result of concatenating blocks 514 and 518. In the described embodiment, all ANCs use a common ID. Alternately, the ANCs may use one of a set of defined five digit IDs that reflect 1xEVDO network MSID generation. Since all ESN are generated by the manufacturer and guaranteed to be unique, and since the five-character string generated by the ANC is unique to 1xEVDO networks, the 15-character string is unique. The ANC uses the unique 15-character string as the MSID when communicating with the PDSN (step 524).

Figure 6:
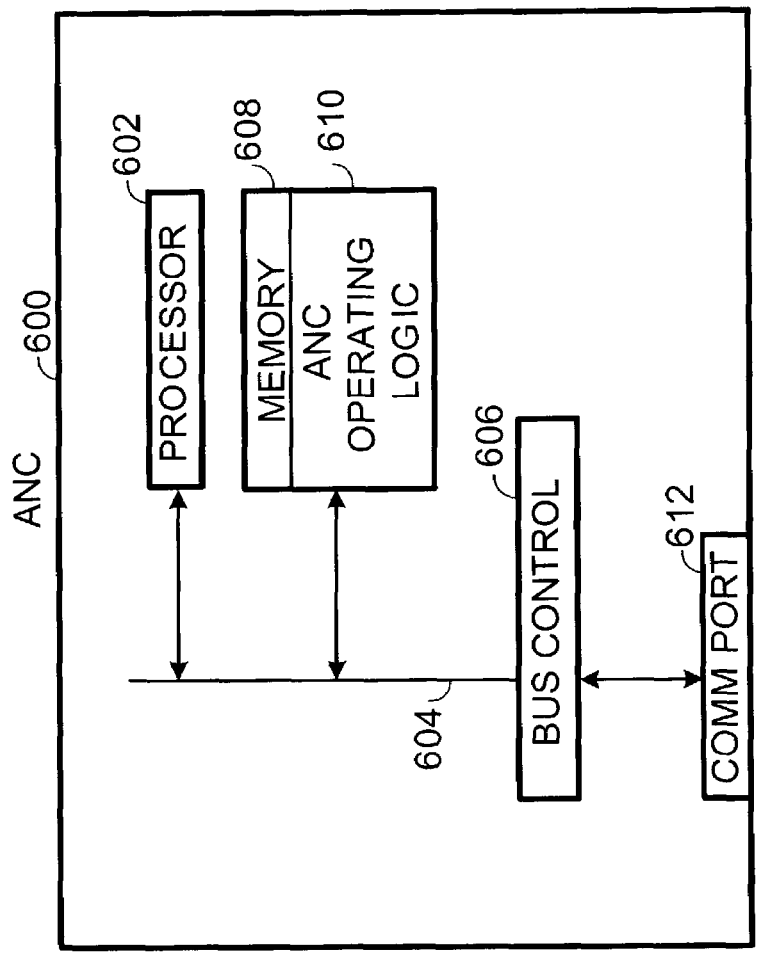
FIG. 6 is a functional block diagram that illustrates one embodiment of an ANC.

FIG. 6 is a functional block diagram that illustrates one embodiment of an access network controller (ANC). Referring now to FIG. 6, an ANC 600 includes a processor 602 that is coupled to communicate over a bus 604. A bus controller 606 controls communications over bus 604. A memory 608 further is coupled to bus 604 and includes computer instructions that are retrieved by processor 602 over bus 604 for execution. The computer instructions within memory 608 define the operational logic of ANC 600. For example, memory 608 includes a memory portion 610 that includes computer instructions that define the ANC operational logic. The computer instructions within memory portion 610 define logic that is described by the signal sequence diagram and flowcharts and other descriptions herein of the present embodiment of the invention relating to generation and using the 15 digit MSID. Bus controller 606 further is coupled to a communication port 612 through which ANC 600 communicates with external devices. Thus, when processor 602 retrieves the computer instructions stored within memory portion 610 and executes them to determine that it should generate an MSID, processor 602 generates the MSID and transmits it over bus 604 through bus controller 606 and out communication port 612 for transmission to a packet data serving node (PDSN).

Figure 7:
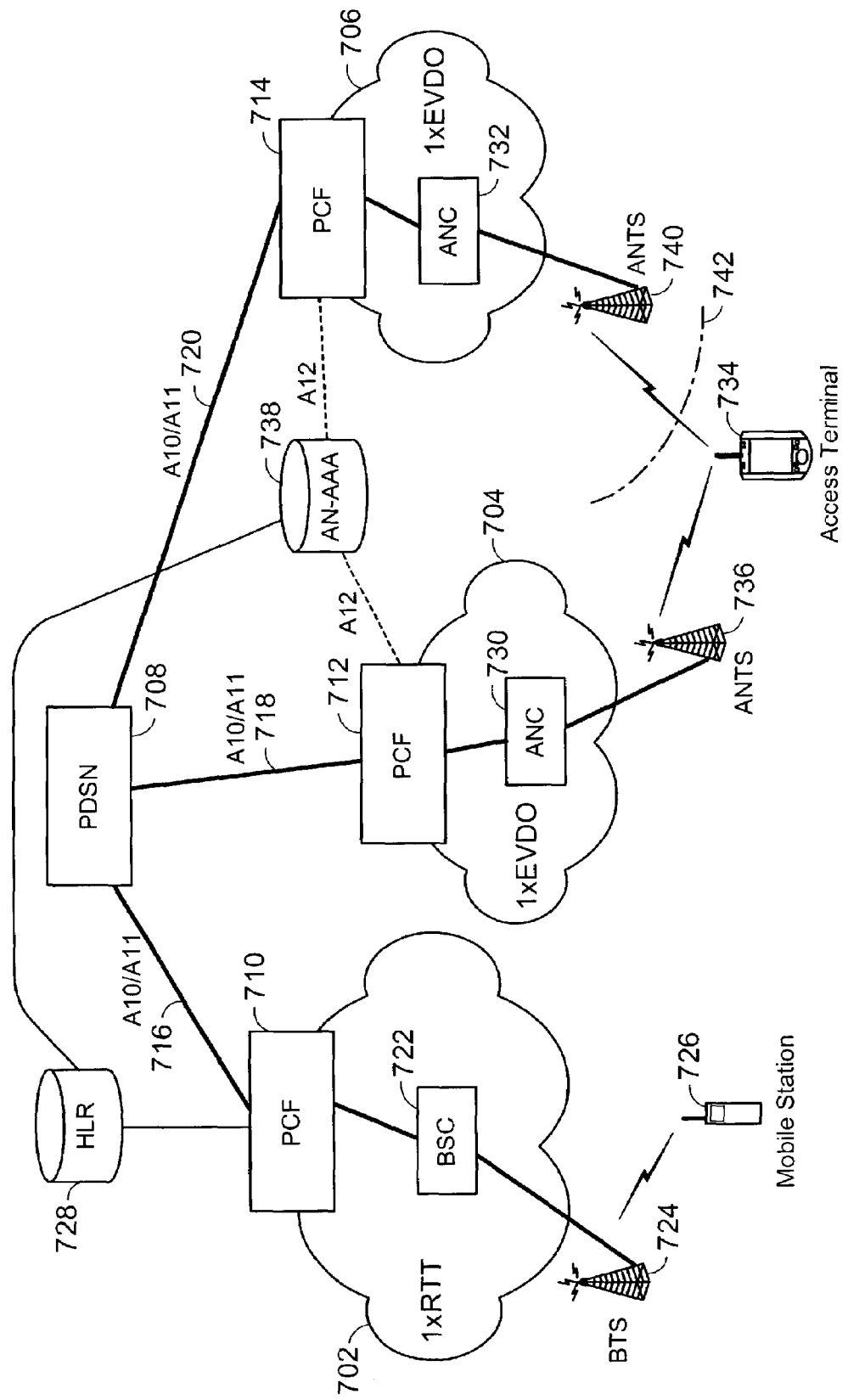
FIG. 7 is a functional block diagram of a voice and data network illustrating a denial of service problem solved by one embodiment of the present invention.

FIG. 7 is a functional block diagram of a voice and data network illustrating a denial of service problem solved by one embodiment of the present invention. Networks 702, 704 and 706 are served by a single packet data serving node (PDSN) 708. Packet control functions (PCF) 710, 712, and 714 communicate with PDSN 708 via A-10 and A-11 interfaces 716, 718, and 720. Network 702 is a 1xRTT network comprising base station controller (BSC) 722 and base transceiver station (BTS) 724. When mobile station 726 signals BTS 724 to place a data call, the mobile station is authenticated by PCF 710 in communication with home location register (HLR) 728. After authentication, communication is established by the A-10/A-11 interface 716.

Networks 704 and 706 are 1xEVDO networks served by PCFs 712 and 714, respectively and application network controllers (ANC) 730 and 732, respectively. In the example of FIG. 7, access terminal (AT) 734 initially requests service from ANC 730 via access network transceiver (ANTS) 736. ANC 730 generates a hardware ID request, to which AT 734 responds with an electronic serial number (ESN). The PDSN requires a MSID to establish a data session so the ANC generates a random MSID due to the absence of optional interface A-12 used to access AN-AAA 738. Without an A-12 interface, however, PCF can not authenticate the AT. Thus there is no mechanism to avoid duplicate MSIDs because an MSID in network 702, mobile station 726 for example, may be repeated in networks 704 or 706 for ATs therein. Whenever PDSN 708 receives an MSID that matches an existing MSID, the PDSN drops the first data session under an assumption that the first MSID has roamed to a new network. MS 726 will receive a denial of service when it attempts to reconnect.

As AT 734 moves from the geographic area served by ANTS 736 to the geographic area served by ANTS 740, the AT will cross a threshold 742 wherein the pilot signal strength from ANTS 740 will be greater than that being received from ANTS 736. At this point, AT 734 will request a session with the ANC generating a better signal. Without the inventive method, PCF 714 will generate a random MSID for AT 734 and establish a data session with PDSN 708 based on this new MSID. In this scenario, PDSN 708 is not able to determine that an existing session is to be continued because it cannot determine that the "new" AT is the same as the one with to which a session is in progress. Using the inventive method, ANC 732 would generate the same MSID as generated by ANC 730 thus PDSN 708 will move the data session from PCF 712 to PCF 714 thereby facilitating a "hand-off" from one network to another while a data session is in progress.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A 1x EVolution-Data Optimized (1xEVDO) data only network communication element, comprising:
   a bus to transmit computer instructions and control signals within a Packet Data Serving Node (PDSN);
   a processor coupled to the bus for executing the computer instructions;
   memory coupled to the bus, the memory including computer instructions executable by the processor, that upon execution prompt the processor to define operational logic determining an A-12 interface has not been established or is not operational in a given geographic area and to define operational logic for, responsive thereto, causing an access network controller (ANC) to generate a unique mobile station ID (MSID) for an access terminal (AT) seeking to establish a data session in a 1xEVDO data network; and
   wherein the unique MSID comprises a unique identifier reflecting that the communication link is being established within the 1xEVDO data network.

2. The 1xEVDO data only network communication element of claim 1 wherein the computer instructions stored within the memory define logic to prompt the processor to retrieve an electronic serial number (ESN) for the AT.

3. The 1xEVDO data only network communication element of claim 2 wherein the computer instructions stored within the memory define logic to prompt the processor to convert the ESN into an ASCII character string representing an unsigned decimal equivalent of the ESN.

4. The 1xEVDO data only network communication element of claim 3 wherein the computer instructions stored within the memory define logic to prompt the processor to prepend as many of a specified digit as is required to create a ten digit character string whenever the ESN converts to a value that is less than ten digits long.

5. The 1xEVDO data only network communication element of claim 4 wherein the specified digit is a "0" (zero).

6. The 1xEVDO data only network communication element of claim 4, wherein the computer instructions stored within the memory define logic to prompt the processor to concatenate a five character unique identifier of the data session of the 1xEVDO data network to the ten digit character string to create a fifteen digit MSID.

7. A method in a 1x EVolution-Data Optimized (1xEVDO) data only network, performed by communication elements, of generating a unique mobile station ID (MSID) for an access terminal (AT), comprising:
   in a first communication element:
      determining that a data session is to be set up for the AT in the 1xEVDO data only network;
      determining that an A-12 interface has not been established or is not operational in a geographic area served by the first communication element;
      determining an electronic serial number (ESN) for the AT; and
      generating a unique MSID for the AT that includes a unique 1xEVDO network identifier and an identifier that reflects the ESN.

8. The method of claim 7 wherein generating a unique MSID further comprises converting the ESN to a decimal number up to 10 digits long.

9. The method of claim 8 wherein converting the ESN further comprises prepending at least one specified digit to cause the converted ESN to be a ten digit number.

10. The method of claim 8 wherein generating a unique MSID further comprises prepending a unique 1xEVDO identifier to the converted ESN.

11. The method of claim of 2 wherein the unique 1xEVDO identifier is the same for a plurality of 1xEVDO networks.

12. The method of claim of 7 including dropping the data session in a geographic area served by the first communication element as the AT transitions into a geographic area served by a second communication element.

13. The method of claim of 12 wherein the method includes, in the second communication element, generating a unique MSID for the AT in the geographic area served by the second communication element.

14. The method of claim of 13 wherein the unique MSID generated for the AT by the second communication element is the same as the MSID generated by the first communication element.

15. The method of claim 14 further including resuming a dropped data session.

16. A method in a packet data serving node (PDSN) of maintaining a 1x EVolution-Data Optimized (1xEVDO) data session for an access terminal (AT) that transitions from a first geographic area served by a first communication element to a second geographic area served by a second communication element, the method comprising:
   receiving a first unique fifteen digit MSID for the AT seeking to establish a data session from the first communication element;
   establishing the data session;
   receiving a second unique fifteen digit MSID for the AT seeking to establish a data session from the second communication element;
   determining that the second unique fifteen digit MSID is the same as the first unique fifteen digit MSID for the data session with the first communication element; and
   terminating the data session with the first communication element and continuing the data session with the second communication element.

* * * * *